Feb. 6, 1951     N. F. ANDREWS     2,540,315
FLEXIBLE AND PILOTED SHAFT COUPLING
Filed Jan. 3, 1950
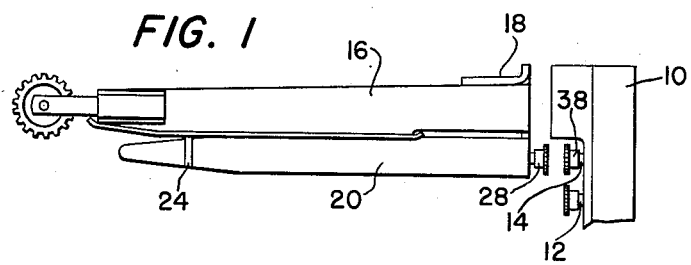
FIG. 1
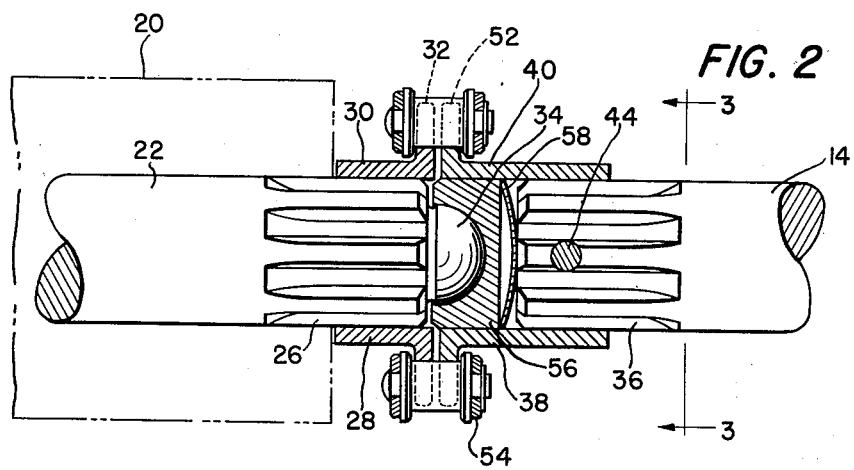
FIG. 2
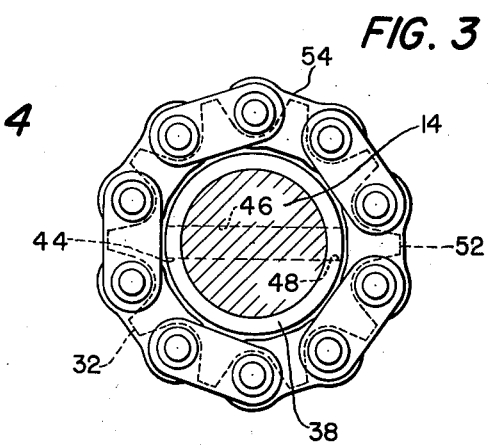
FIG. 3
FIG. 4
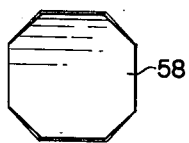
FIG. 5
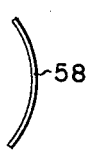
FIG. 6
INVENTOR.
N. F. ANDREWS
BY
ATTORNEYS Patented Feb. 6, 1951

2,540,315

UNITED STATES PATENT OFFICE 2,540,315

FLEXIBLE AND PILOTED SHAFT COUPLING

Norman F. Andrews, Ankeny, Iowa, assignor to Deere Manufacturing Co., Dubuque, Iowa, a corporation of Iowa Application January 3, 1950, Serial No. 136,627

5 Claims. (Cl. 64—19)

This invention relates to a shaft coupling and more particularly to a coupling of the flexible type provided between substantially coaxial, end-to-end shafts and interconnecting the shafts for rotation together while permitting limited variations in axial alinement.

The invention provides a coupling designed primarily for use in connecting the snapping rolls of a corn picker to their driving shafts. In the conventional corn picker, there are a pair of generally parallel snapping rolls normally connected at their upper ends respectively to driving shafts. The lower ends of the snapping rolls are mounted for lateral adjustment to vary the space therebetween for the passage of cornstalks. Obviously, the lateral adjustment of the lower ends of the snapping rolls varies the axial alinement thereof with the driving shafts and it has heretofore been known to provide some form of flexible coupling between each snapping roll and its driving shaft. It has been found, however, that most flexible couplings allow non-parallelism between the axes of the driving shafts and the snapping rolls at the point of coupling, which ultimately results in eccentricity of the coupling, causing undesirable vibration and excessive wear. According to the present invention this mis-alinement at the point of coupling is eliminated by the provision of pilot means which maintains the axes substantially coincident at this point while allowing angular movement of one of the shafts generally about this point. It is an important object of the invention to provide an improved and simplified coupling that is inexpensive in design and that will operate efficiently for long periods without maintenance and adjustment.

The foregoing and other important objects and desirable features inherent in and encompassed by the invention will become apparent from the following detailed description of a preferred embodiment of the invention as illustrated in the accompanying sheet of drawings in which:

Figure 1 is a general plan view of the snapping roll and drive arrangement typical of a corn picker;

Figure 2 is an enlarged sectional view of the shaft and the coupling therefor;

Figure 3 is a view taken on the line 3—3 of Figure 2;

Figure 4 is a sectional view of one of the coupling members per se; and

Figures 5 and 6 are respectively face and side elevational views of the pilot control spring.

In Figure 1 the numeral 10 designates a structural part of a corn picker which may include a gear housing from which projects a pair of forwardly extending drive or power take-off shafts 12 and 14. The shaft 14 appears also in Figures 2 and 4. The numeral 16 designates a frame member attachable at 18 to the structural part 10. This frame member has disposed along the inside thereof and parallel thereto a snapping roll 20, the axis of which is substantially in alinement with the axis of the drive shaft 14. The illustration in Figure 1 is of the parts in their positions just prior to assembly.

The rear end of the snapping roll 20 has a shaft part 22 proximate to the proximate end of the shaft 14, so that the proximate ends of these two shafts are slightly spaced apart, as best shown in Figure 2. The lower or forward end of the snapping roll 20 is carried by the forward portion of the frame member 16 by means of an adjustable bearing support 24. It will be understood that a second snapping roll (not shown) normally parallels the snapping roll 20 and is connected at its rear end to the drive shaft 12. The adjustment provided at 24 is for the purpose of varying the spacing between the two snapping rolls. As will hereinafter appear, the proximate ends of the drive shaft 14 and snapping roll shaft 22 are maintained substantially constant even though the lower end of the snapping roll may be adjusted laterally as aforesaid.

The rear end of the snapping roll shaft 22 is splined at 26 to carry a first coupling member 28. This member has an internally splined hub 30 which receives the spline 26, thus mounting the coupling member on the shaft for rotation therewith while permitting limited axial sliding relative thereto. The coupling includes an external peripheral drive portion in the form of a plurality of teeth 32. The rear end of the shaft 22 includes means providing thereon an axially rearwardly projecting hemispherical pilot member 34. The member 34 is preferably formed as an integral part of the rear end of the shaft 22. As best seen in Figure 2 the pilot member terminates short of the proximate end of the drive shaft 14.

The forward end of the drive shaft 14 is splined at 36 for the purpose of carrying a second coupling member 38. This member includes a tubular portion or hub 40 part of the axial length of which is splined at 42 to receive the spline 36 (Figure 4). The coupling member 38 is thus constrained for rotation with the shaft 14. A connecting pin 44 passes diametrically through a bore 46 in the shaft 14 and through diametrically alined bores 48 in the hub 40 of the coupling member 38, fixing the coupling member against axial shifting relative to the shaft 14.

The other part of the axial length of the tubular hub 40 surrounds the pilot member 34 and thus encloses the space between this pilot member and the proximate or forward end of the shaft 14. This part of the tubular hub is not splined but is internally cylindrical, as best seen at 50 in Figure 4. That portion of the tubular hub 40 proximate to the driving portion 32 of the coupling member 28 likewise has an external peripheral drive portion in the form of a plurality of teeth 52. The driving portions are interconnected by flexible means comprising an endless link chain 54 wrapped therebout. It will be noted that the general plane in which lies the peripheral portion 32 of the coupling member 28 intersects or passes through the center about which the hemispherical pilot member is formed. Further, the peripheral driving portion 52 of the second coupling member 38 is closely proximate to the driving portion 32, whereby both driving portions are in substantially the same zone.

A hemispherically socketed element 56 is carried by and within the internally cylindrical part of the tubular portion 40 and is complementary to and receives the hemispherical pilot member 34. The periphery of the element 56 is cylindrical and is thus rotatably and axially shiftably carried by the coupling member 38. The rear face of the element 56 is spaced slightly forwardly from the forward or proximate end of the shaft 14 and there is provided in this space biasing means in the form of a concavo-convex spring 58 (Figures 2, 5 and 6).

The foregoing completes the description of the assembly and parts of the couplings. The snapping roll coupling part and the drive shaft coupling part are brought together, as shown in Figure 1, until the two driving portions 32 and 52 are proximate as shown in Figure 2, after which the flexible means 54 is wrapped thereabout to complete the connection. The mounting at 24 for the forward end of the snapping roll 20 fixes the snapping roll against longitudinal displacement. However, because of manufacturing discrepancies, it is desirable to have the sliding connection at 26—30. Nevertheless, any variation at this point does not affect the coupling, because the biasing means comprising the spring 58 urges the socketed element 56 constantly into engagement with the hemispherical pilot member 34. If dependence were placed alone on the driving chain 54 to maintain axial alinement at the point of coupling, wear in the chain would soon permit radial offset or eccentricity. However, this difficulty is eliminated because of the provision of the pilot 34—56. This pilot is relatively radially fixed, although axially shiftable. Because of the hemispherical connection, angular misalinement about the center of the hemisphere may occur between the shafts 14 and 22. Such variation will occur, of course, upon adjustment of the snapping roll 20 at 24 or may occur because of manufacturing discrepancies.

To further add to the long life of the assembly, the element 56 is formed of lubricant-impregnated metallic material, preferably of the type commercially known as "Oilite."

Various other features and advantages not specifically enumerated above will undoubtedly occur to those versed in the art, as likewise will numerous modifications and alterations in the preferred embodiment of the invention disclosed, all of which may be achieved without departing from the spirit and scope of the invention as defined in the appended claims.

What is claimed is:

1. A coupled shaft assembly, comprising: first and second shafts arranged substantially coaxially in end-to-end relationship with their proximate ends spaced apart axially; means fixed to the proximate end of the first shaft and projecting axially toward but terminating short of the proximate end of the second shaft and providing a hemispherical pilot member having a maximum diameter less than that of either shaft; a first coupling member carried by the first shaft at said proximate end thereof, for rotation therewith and for limited axial shifting relative thereto, and having an external peripheral drive portion lying generally in a plane normal to the shaft axis and intersecting the center of the pilot member; a second coupling member carried by the second shaft at its proximate end, and constrained for rotation therewith, and having a tubular portion surrounding the pilot member and provided with an external peripheral driving portion proximate to the driving portion of the first coupling member; an endless flexible coupling element wrapped about said driving portions; a hemispherically socketed element axially shiftably carried by and within the tubular portion of the second coupling member between the pilot member and the proximate end of the second shaft, and complementary to and receiving the pilot member; and biasing means within said tubular portion and acting against said proximate end of the second shaft and the socketed member to urge the latter onto said pilot member.

2. The invention defined in claim 1, further characterized in that: said proximate end of the second shaft is externally splined and a part of the axial length of said tubular portion is complementarily internally splined, the remaining part of the axial length of said tubular portion being internally cylindrical; and the socketed element being externally cylindrical and both slidably and rotatably received in said cylindrical part of said tubular portion.

3. The invention defined in claim 1, further characterized in that: the axial distance between said proximate end of the second shaft and the socketed element is relatively short; and said biasing means is a concavo-convex spring of flat stock.

4. The invention defined in claim 1, further characterized in that: the socketed member is formed of lubricant-impregnated metallic material.

5. A coupled shaft assembly, comprising: first and second shafts arranged substantially coaxially in end-to-end relationship with their proximate ends spaced apart axially; means fixed to the proximate end of the first shaft and projecting axially toward but terminating short of the proximate end of the second shaft and providing a hemispherical pilot member having a maximum diameter less than that of either shaft; a first coupling member carried by the first shaft at said proximate end thereof, for rotation therewith, and having an external peripheral drive portion lying generally in a plane normal to the shaft axis and passing through the pilot member; a second coupling member carried by the second shaft at its proximate end, and constrained for rotation therewith, and having a tubular portion surrounding the pilot member and provided with an external peripheral driving portion proximate to the driving portion of the first coupling member; flexible coupling means interconnecting said driving portions; a hemispherically socketed element axially shiftably carried by and within the tubular portion of the second coupling member between the pilot member and the proximate end of the second shaft, and complementary to and receiving the pilot member; and biasing means within said tubular portion and acting against said proximate end of the second shaft and the socketed member to urge the latter onto said pilot member.

NORMAN F. ANDREWS.

REFERENCES CITED

The following references are of record in the file of this patent:

UNITED STATES PATENTS

| Number | Name | Date |
| --- | --- | --- |
| 2,451,683 | Mantle | Oct. 19, 1948 |

FOREIGN PATENTS

| Number | Country | Date |
| --- | --- | --- |
| 115,451 | Great Britain | 1918 |